J. R. MATLACK.
CORN-PLANTER.

No. 185,642. Patented Dec. 26, 1876.

J. R. MATLACK.
CORN-PLANTER.
No. 185,642. Patented Dec. 26, 1876.
2 Sheets—Sheet 2.
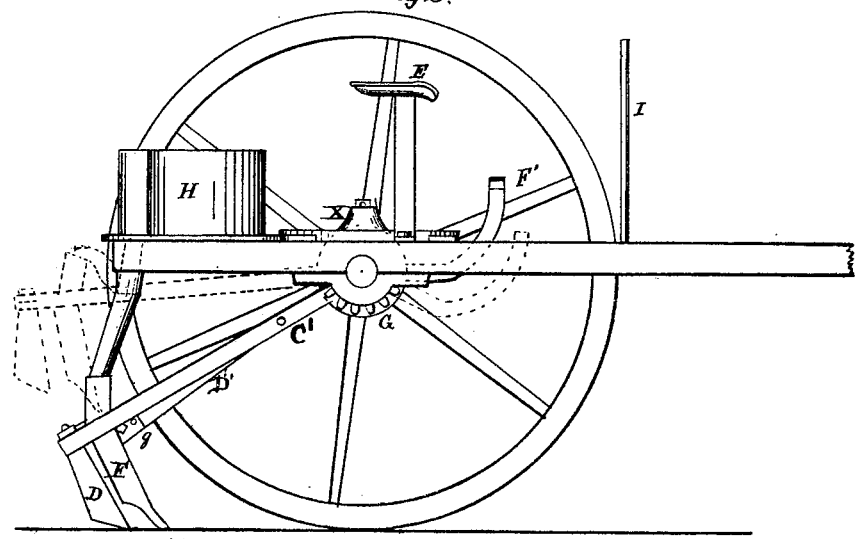
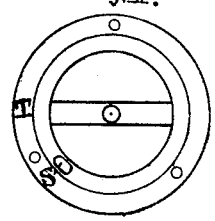
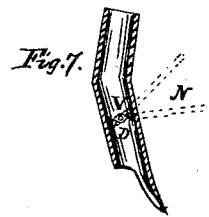
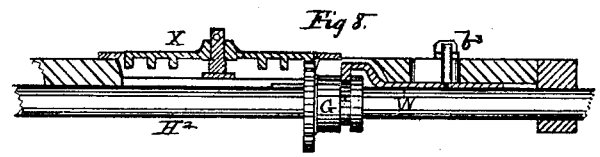
Attest:
J. T. Kibler
N. H. Ballard
Inventor:
J. R. Matlack
By J. B. Hunt & Co.
Att'ys
THE GRAPHIC CO. N.Y.

UNITED STATES PATENT OFFICE.

JOSEPH R. MATLACK, OF COX'S MILLS, INDIANA.

IMPROVEMENT IN CORN-PLANTERS.

Specification forming part of Letters Patent No. 185,642, dated December 26, 1876; application filed January 14, 1876.

*To all whom it may concern:*

Be it known that I, JOSEPH R. MATLACK, of Cox's Mills, county of Wayne and State of Indiana, have invented certain Improvements in Corn-Planters, of which the following is a specification:

My invention relates to that class of corn-planters which are placed upon wheels and may be made to plant two or three rows at a time, either in check-rows or drills, as will be fully described hereafter.

Figure 1:
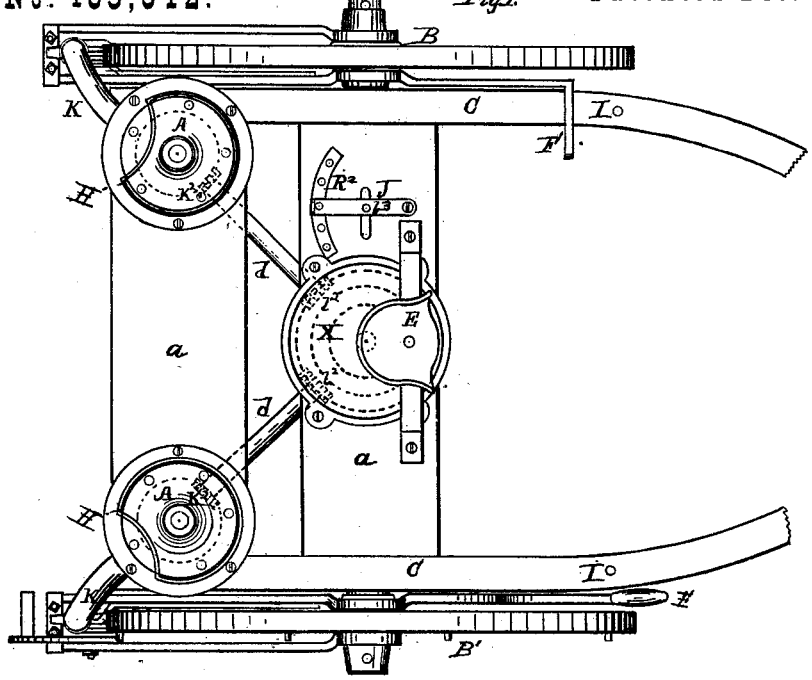
Figure 2:
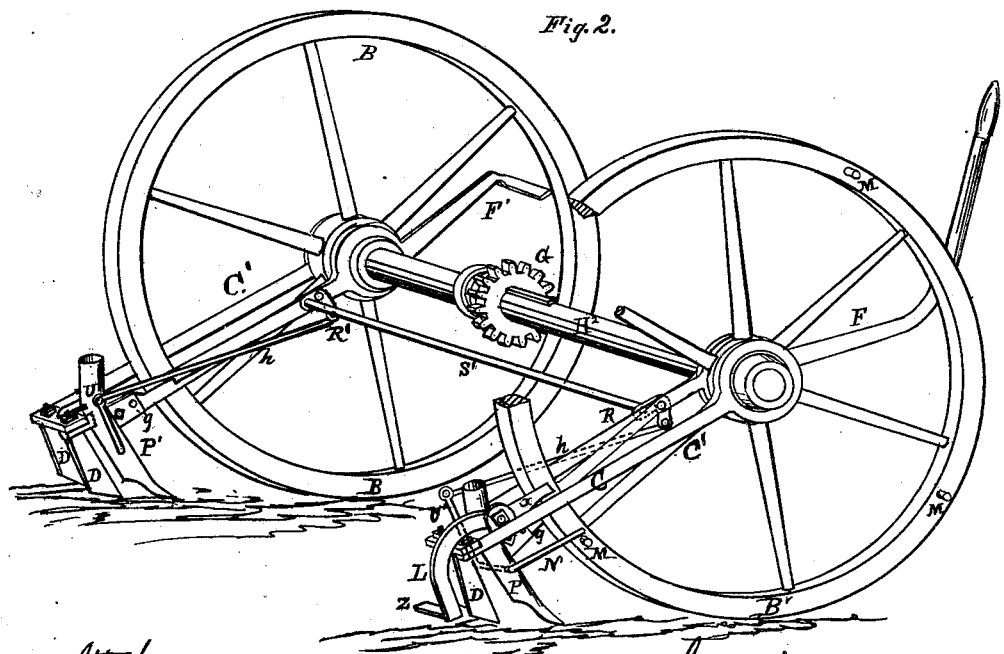

Figure 1 is a top view, showing the position of the hoppers, index-wheel, and driver's seat, also the attachment of the elastic dropping-tubes. Fig. 2 is a perspective view of the wheels and axle, and showing the position of the check-row mechanism and marker, and also the driving-gear on the axle. Fig. 3 is a side elevation of the machine. Fig. 4 is a plan view of the plate upon which the dropping-plates A turn. Fig. 5 is a sectional view of the same. Fig. 6 is an edge view of the dropping-plates, showing the teeth on the under side. Fig. 7 is a vertical section of the seed-spout or tooth, and showing the valve. Fig. 8 is a detached view of the axle with driving wheel or pinion attached and showing the index-wheel X and shifting-clutch W in section. Fig. 9 is a perspective of the shifting-clutch.

A A, Fig. 1, are the dropping-plates, B B' the wheels, and C C the thills; E, the driver's seat; D D, the shovels or coverers; F, hand-lever; F¹, foot-lever. H² is the axle, having the drive-gear or pinion G sliding thereon, to shift or change the distance of drop. H H are the seed-hoppers. I I are posts or standards, for the purpose of sighting to keep the machine in line while check-row dropping. J is the shifting-lever, working in connection with the circular plate R², for the purpose of shifting the driving-gear G in and out of gear or into the different rows of teeth on the index-wheel X. The plate R² has holes for the reception of a pin in the end of the shifting-lever J, in order to hold the wheel G in any required position. K K are flexible tubes, which connect the dropping-plates or the tube S, on plate T, Fig. 4, with the tubes or drill-teeth P P', Fig. 2. L, Fig. 2, is a marking device, which is operated by means of pins M on the side of the wheel B'. N, Fig. 2, is the lever by means of which the valves V, Fig. 7, are operated. This lever is also tripped by means of the pins M on the side of the wheel B'. The upright rod v' is also attached to the valve in the tube P, and through the means of the rod h, crank R, rod S', crank R', and rod h', connects with upright rod U, attached to the valve in the tooth P'.

Thus it will be seen that the pins M, striking the lever N, operate both valves simultaneously by means of the above-described arrangement of the rods. The arms C' are attached to the hubs of the wheels in front, and have the coverers D attached to their rear ends. The arms D' (best seen in Fig. 3) are pivoted at their forward ends to the arms C', and are pivoted to the teeth or spouts at g.

Thus it will be seen that the arms C', attached to the hubs of the wheels and carrying the hand-lever F and foot-lever F' in front, and extending back in rear of the wheels, carry the coverers D D, tubes or spouts P P', and marker L, all of which can be lifted simultaneously at will by the operator. The wheel G slides upon the axle, and is operated by means of the clutch W, to shift it into mesh with any one of the different rows of teeth in the index-wheel X, which communicates motion to the drop-plates A A through the rods or shafts d and pinions K², the distance apart of the drop being adjusted by means of the wheel G, in connection with the index-wheel X.

Having thus fully described my invention, what I claim and desire to secure by Letters Patent, is—

1. The combination and arrangement of the arms C', attached to the hubs of the ground-wheels, and carrying the hand-lever F and foot-lever F' in front, and extending back in rear of the wheels and carrying the tubes P P', and coverers D D, and marker L, substantially as described.

2. The arms C', attached to the wheels, as shown, and carrying the coverers D and marker L, in combination with the pins M, for operating the marker, substantially as described.

3. The combination and arrangement of the upright rod $v'$, rod $h$, crank R. rod S', crank R', rod $h'$, and upright rod U, for operating the valves in tubes P and P' simultaneously, as described.

4. In combination with rods U U' $h$ $h'$, cranks R R', and rod S', the lever N and pins M, with wheel B', substantially as and for the purpose specified.

JOSEPH R. MATLACK.

Witnesses:
   EDWARD R. MATTHEWS,
   W. THOMAS.